June 22, 1948.　　　　　E. B. JOHNSON　　　　　2,443,824
SPREADING TOOL

Filed Nov. 28, 1945　　　　　　　　　　　　　2 Sheets-Sheet 1

Inventor
Ernest B. Johnson

By

*A. F. Flournoy*

Attorney

June 22, 1948.  E. B. JOHNSON  2,443,824
SPREADING TOOL

Filed Nov. 28, 1945  2 Sheets-Sheet 2

Inventor
Ernest B. Johnson

By
A. F. Flournoy
Attorney

Patented June 22, 1948

2,443,824

UNITED STATES PATENT OFFICE 2,443,824

SPREADING TOOL

Ernest B. Johnson, Shreveport, La.

Application November 28, 1945, Serial No. 631,281

3 Claims. (Cl. 29—284)

My invention relates to spreading tools, but more particularly to spreading tools for use in automotive motor and generator repair work.

As far as I know, no practical spreading tool has been put into use to accomplish the objects and aims of my invention hereunder disclosed in this specification.

Great difficulty is met with by repair men in the repair of motors and generators due to the fact that the new field coils supplied to the trade for repairs have not been formed correctly to the contour of the inside of the motor housings or generator housings in which they are intended to be assembled. The coils only become formed during the assembly of them as they are brought into place by the pole pieces which they encircle and by which they are clamped against the inside wall surfaces of the motor or generator housings. When placed in their proper assembled positions the pole pieces are clamped in place by screws extending through the housing wall surfaces of the generators or motors.

Due to the stiffness of the field coils, the pole pieces cannot be brought up into contact with the inner wall surfaces of the motor housing or generator housing under the prior art practice unless the pole pieces are pounded into place by the means of a mandrel of some sort. My invention does away with the use of a mandrel to pound the pole pieces into place.

An object of my invention is to provide a spreading tool adapted to force pole pieces and field coils surrounding the same into proper positions preparatory to being fastened in the motor housing or generator housing.

Another object of my invention is to provide a spreading tool for use in the assembly of pole pieces and field coils in a motor or generator in which the spreader is adapted to support the weight of the motor housing or generator housing and hold it in proper position to receive pole pieces being pushed in place by the spreading tool.

Another object of my invention is to provide a spreading tool with a pair of feet adapted to be engaged by a vice to make use of the power of the vice in operating the spreader.

Other objects and advantages of my invention will become apparent in the course of my detailed description to follow of a spreading tool embodying my invention shown illustrated in the accompanying drawings.

Figure 1:
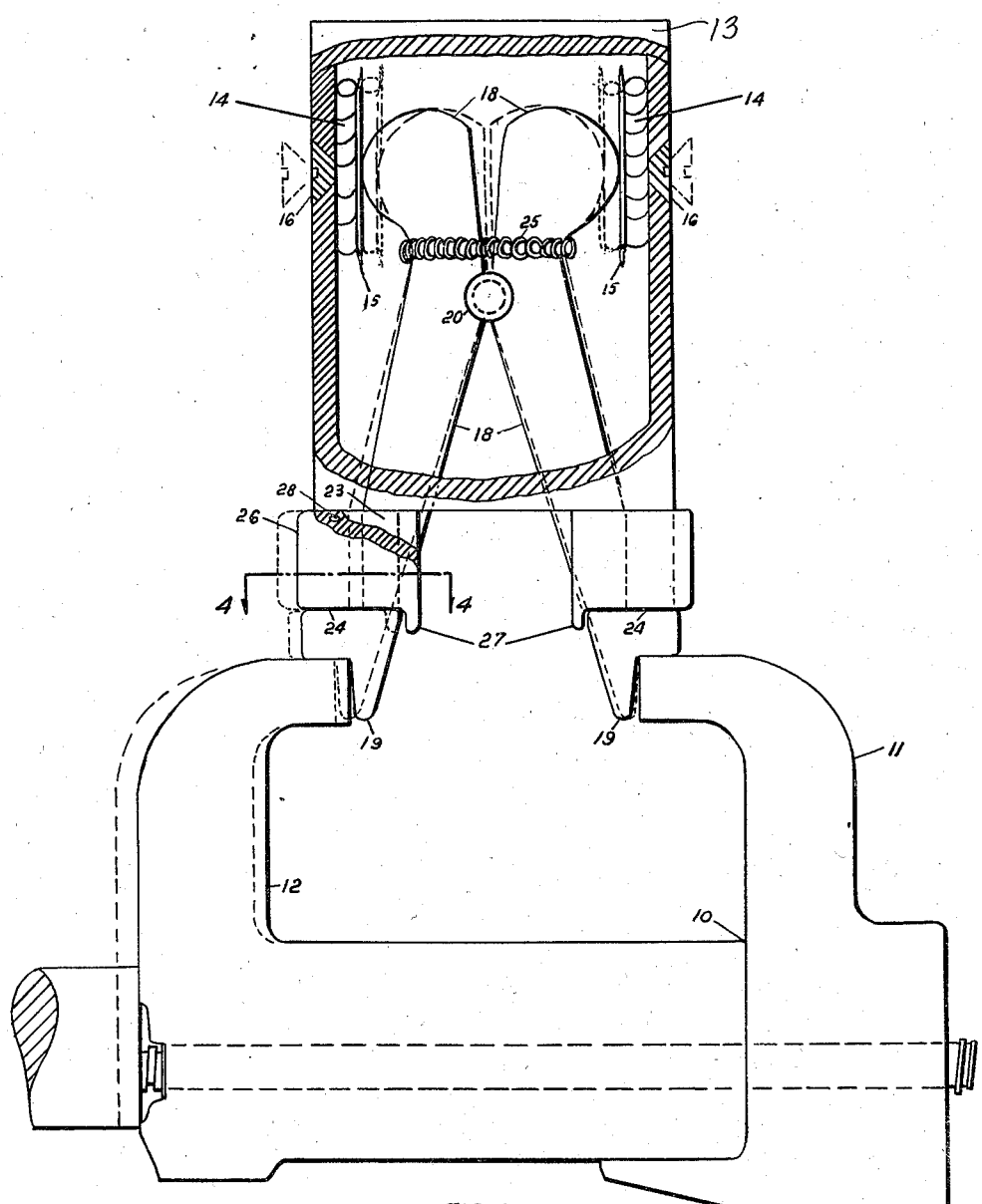
Figure 1 is an elevational view partly broken illustrating the operation of a spreading tool embodying my invention.
Figure 3:
Figure 3 is a detailed view of a part of the spreader illustrated in Figure 1.

I have illustrated a spreading tool that embodies my invention in Figure 1 of my drawings set in a vice 10 and being clamped between the stationary jaws 11 and movable jaws 12 of the same to show how it is used inside of a generator housing 13 in the assembling of field coils 14 underneath pole pieces 15. When the pole pieces 15 are pressed into their proper assembling positions the screws 16 may be easily screwed down without injury to the screws 16.

It is to be understood, however, that my invention in spreading tools is not limited to the single use of spreading of the pole pieces 15 and the forming of the coils 13 in the assembling operation illustrated by Figure 1 of my drawings.

The spreading tool illustrated in the figures of my drawings is comprised of the pair of identical complementary spreading arms 17, each of which is provided with a rounded pressing head 18 and each of which is provided with a shouldered foot 19 adapted to be clamped in the jaws of a vice.

The spreading arms 17 are pivotally mounted with respect to each other by means of a spool shaped pivot pin 20 which fits into the transversely extended semi-cylindrical grooves 21 formed in the inner surfaces of the respective spreading arms 17. Each spreading arm 17 is provided with a spring retaining groove 22.

Figure 4:
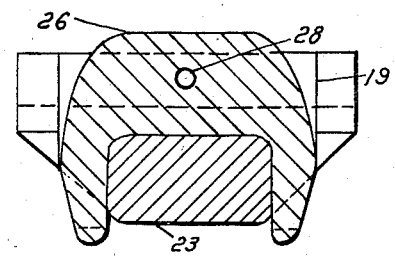
Figure 4 is a cross-sectional view taken on line 4—4 of Figure 1.
Figure 2:
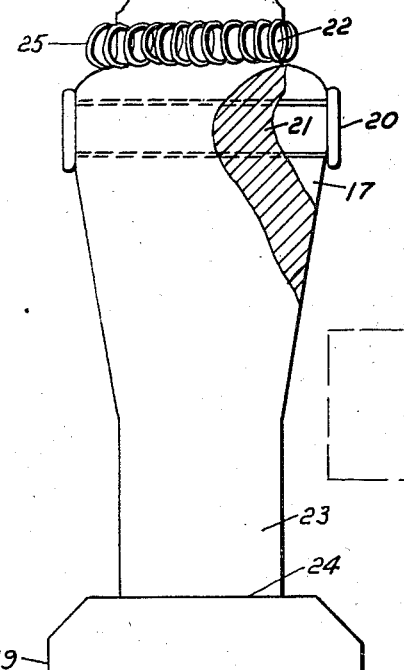
Figure 2 is an enlarged elevational view of the spreading tool as seen from either the right or the left side of Figure 1.
Figure 5:
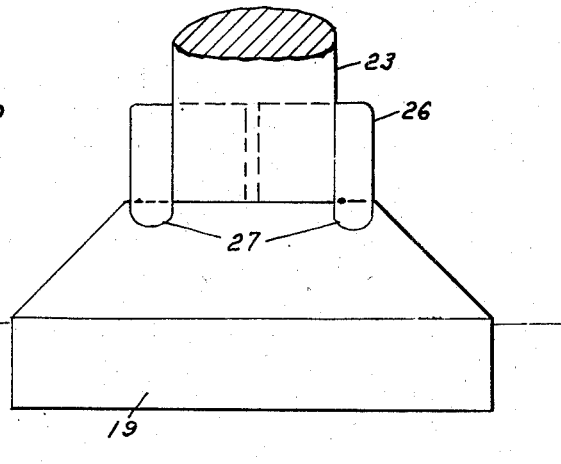
Figure 5 is a fractional elevational view of a portion of the spreading tool illustrated in Figure 1.

Each spreading arm 17 above its shouldered foot portions 19 is provided with a flat shelf surface 24 from which arises a cylindrical portion 23. Spacing blocks 26 provided with depending retaining fingers 27 are shaped to rest on the shelf surfaces 24 and embrace the cylindrical portions 23 as best seen in Figure 4 of the drawings.

Each of the spacing blocks 26 is provided with a bore 28 by means of which it may be strung on a wire and hung up in a shop. It is contemplated that the numerous pairs of spacing blocks 26 of varying thicknesses will be used in the vertical spacing of various sized generator housings with which the spreading tool is used.

The shelf surfaces 24 may themselves serve as supporting surfaces for holding a generator housing of a length equal to or greater than the combined length of the illustrated housing 13 and the length of the illustrated spacing blocks 26.

The reader will appreciate that the pair of pivoted spreading arms 17 used with only the spool shaped pivot pin 20 would constitute a spreading tool. I prefer, however, to employ also in this spreading tool construction a retaining spring 25. The retaining spring 25 is seated in the spring retaining grooves 22 and serves not only as a means for retaining the pivoted spreading arms 17 in assembled positions on the pivot pin 20, but serves also as a means for contracting the spreading arms 17 to the dotted line closed position shown in Figure 1 in which position the pressing heads 18 are brought into contact with each other.

In the operation of this spreading tool, the force of the vice 10 is used to overcome the tension of the spring 25 in addition to performing the work of forcing the pole pieces 15 and coils 14 into their proper assembling positions on the inner surface of the generator housing 13. I prefer to use the spool shape pivot pin 20 for the reason that it cannot work out of its assembled position in the working of the spreader.

It is to be understood that various changes in the size and arrangement of the parts of the illustrated spreading tool may be made within the scope of my invention.

Having thus described my invention, I claim:

1. A spreading tool comprising a pair of elongated spreading arms, each of which is provided with a transversely extending pivot pin groove, said spreading arms being arranged in opposition to each other throughout their entire length and means for pivotally connecting the arms to each other including a pivot pin lying in the grooves of said spreading arms, each of said spreading arms being provided with an outwardly extending pressing head positioned above the pivoting point of said spreading arms, each of said spreading arms being provided with an outwardly extending ledge portion adapted to support a generator housing or the like, said ledge portions being located below the pivot point of said spreading arms.

2. A spreading tool comprising a pair of elongated duplicate spreading arms, said spreading arms being arranged in opposition to each other throughout their entire length and means for pivotally connecting the arms to each other, each of said spreading arms being provided with an outwardly extending pressing head positioned above the pivot point of said spreading arms, each of said spreading arms being provided with an outwardly extending ledge portion, a removable spacing block adapted to support a generator housing or the like positioned on said ledge, said ledge portion being located below the pivot point of said spacing arms.

3. A spreading tool comprising a pair of elongated spreading arms of equal length, said spreading arms being arranged in opposition to each other throughout their entire length and means for pivotally connecting the arms to each other, each of said spreading arms being provided with an outwardly extending pressing head positioned above the pivot point of said spreading arms, the lower end of each of said spreading arms being provided with a right angular groove extended throughout its lower end, said grooves constituting a pair of face portions lying in substantially parallel planes in all working positions of the spreading tool adapted to be clamped in a vice and also a pair of stops adapted to align said pair of spreading arms in vertical positions in a vice in all working positions of said spreading tool, each of said spreading arms being provided with an outwardly extending ledge portion adapted to support a generator housing or the like, said ledge portions being located below the pivot point of said spreading arms.

ERNEST B. JOHNSON.

REFERENCES CITED

The following references are of record in the file of this patent:

UNITED STATES PATENTS

| Number | Name | Date |
|---|---|---|
| 445,506 | Kribs | Jan. 27, 1891 |
| 549,354 | Gallup | Nov. 5, 1895 |
| 1,124,568 | Wiedeke | Jan. 12, 1915 |
| 1,155,288 | Stark | Sept. 28, 1915 |
| 1,527,162 | Alvord | Feb. 24, 1925 |
| 1,707,947 | Zettervall | Apr. 2, 1929 |

FOREIGN PATENTS

| Number | Country | Date |
|---|---|---|
| 391,124 | Great Britain | Apr. 18, 1933 |